(12) United States Patent
Imoto et al.

(10) Patent No.: US 8,462,401 B2
(45) Date of Patent: Jun. 11, 2013

(54) LIGHT SOURCE APPARATUS, LIGHT IRRADIATING APPARATUS PROVIDED WITH SAME LIGHT SOURCE APPARATUS, IMAGE READING APPARATUS PROVIDED WITH SAME LIGHT IRRADIATING APPARATUS, AND IMAGE FORMING APPARATUS PROVIDED WITH SAME IMAGE READING APPARATUS

(75) Inventors: Masahiro Imoto, Osaka (JP); Mitsuharu Yoshimoto, Osaka (JP); Yasuhiro Suto, Osaka (JP); Shohichi Fukutome, Osaka (JP); Hisashi Yamanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 12/776,058

(22) Filed: May 7, 2010

(65) Prior Publication Data
US 2010/0290095 A1 Nov. 18, 2010

(30) Foreign Application Priority Data
May 15, 2009 (JP) ................. 2009-119108

(51) Int. Cl.
| | |
|---|---|
| H04N 1/04 | (2006.01) |
| H04N 1/46 | (2006.01) |
| F21V 9/00 | (2006.01) |
| F21V 1/00 | (2006.01) |
| H01L 33/00 | (2010.01) |
| H01L 29/20 | (2006.01) |
| H01L 27/00 | (2006.01) |
| G06K 7/10 | (2006.01) |
| G01D 11/00 | (2006.01) |

(52) U.S. Cl.
USPC ............ 358/475; 358/474; 358/509; 257/88; 257/89; 235/454; 347/100; 362/231; 362/235; 250/208.1

(58) Field of Classification Search
USPC ........ 358/475, 474, 509; 257/89, 88; 235/454; 347/100; 362/231; 250/208.1
See application file for complete search history.

(56) References Cited

U.S. PATENT DOCUMENTS

| | | | |
|---|---|---|---|
| 5,283,425 A * | 2/1994 | Imamura ................ | 250/208.1 |
| 6,474,836 B1 * | 11/2002 | Konagaya ............... | 362/231 |
| 2002/0054387 A1 * | 5/2002 | Yokota et al. .......... | 358/509 |
| 2006/0077480 A1 * | 4/2006 | Yokota et al. .......... | 358/474 |
| 2007/0194333 A1 * | 8/2007 | Son ......................... | 257/88 |
| 2009/0002774 A1 * | 1/2009 | King et al. .............. | 358/474 |
| 2009/0085996 A1 * | 4/2009 | Kasai ...................... | 347/100 |
| 2011/0121076 A1 * | 5/2011 | Hennick et al. ........ | 235/454 |

FOREIGN PATENT DOCUMENTS

| | | |
|---|---|---|
| JP | 5-304318 A | 11/1993 |
| JP | 2002-305321 A | 10/2002 |
| JP | 2003-257230 A | 9/2003 |

* cited by examiner

Primary Examiner — Charlotte M Baker
Assistant Examiner — Rury Grisham
(74) Attorney, Agent, or Firm — Birch, Stewart, Kolasch & Birch, LLP

(57) ABSTRACT

In one embodiment of a semiconductor apparatus of the present invention, a plurality of light-emitting elements provided with a light-emitting face are disposed at intervals in a line on a surface of a substrate, and serve as a light source apparatus that emits irradiating light forward from the light-emitting face along the surface of the substrate, and on a forward side of the light-emitting face in the surface of the substrate, a light reflection suppression area is formed extending forward with a width less than the width of the light-emitting face from a lower edge of the light-emitting face.

20 Claims, 14 Drawing Sheets

FIG.19

|  |  | light source substrate 10 | light source substrate 10C |
|---|---|---|---|
| color | silk printing layer | white | white |
|  | resist layer | white | green |
| illuminance (lx) | | 36800 | 34200 |

LIGHT SOURCE APPARATUS, LIGHT IRRADIATING APPARATUS PROVIDED WITH SAME LIGHT SOURCE APPARATUS, IMAGE READING APPARATUS PROVIDED WITH SAME LIGHT IRRADIATING APPARATUS, AND IMAGE FORMING APPARATUS PROVIDED WITH SAME IMAGE READING APPARATUS

CROSS-REFERENCE TO RELATED APPLICATION

This application claims priority on Patent Application No. 2009-119108 filed in Japan on May 15, 2009, the entire contents of which are herein incorporated by reference.

BACKGROUND OF THE INVENTION

The present invention relates to a light source apparatus having a plurality of light-emitting elements disposed in a line, a light irradiating apparatus provided with the light source apparatus, an image reading apparatus provided with the light irradiating apparatus, and an image forming apparatus provided with the image reading apparatus.

An image forming apparatus such as a copy machine or a facsimile machine is provided with an image reading apparatus in order to read an image of an original. This image reading apparatus is ordinarily configured with an original placement plate, an original pressing plate, an illumination unit (light irradiating apparatus), and a photoelectric converter.

Herein, the original placement plate is formed of a light-transmitting material, and has the function that an original is placed on a surface of the original placement plate. The original pressing plate has the function of pressing against the back face of the original that has been placed on the surface of the original placement plate.

The illumination unit has the function of, while moving along the original placement plate in a scanning direction, which is the direction orthogonal to the width direction of the original, irradiating the original with irradiating light in the width direction of the original, the irradiating light being passed through the original placement plate. The photoelectric converter has the function of converting reflected light (subject-reflected light) to an image signal, the reflected light being light that has been emitted by the illumination unit and reflected by the original.

Recently, in consideration of life and power consumption, a light source apparatus employing light-emitting diodes has been adopted as a light source in the illumination unit in the above image reading apparatus. As this light source apparatus employing light-emitting diodes, a light source apparatus has been proposed in which light-emitting diodes are disposed at intervals in a line on a substrate (for example, see FIG. 1 of JP 2003-257230A, referred to below as Patent Document 1).

The light source apparatus described in Patent Document 1 is a light source apparatus used in a liquid crystal display. In such a light source apparatus in which light-emitting diodes are disposed at intervals in a line on a substrate, irradiating light includes direct light that is directly emitted from the light-emitting diodes, and substrate-reflected light, which is light that is emitted from the light-emitting diode and reflected by the substrate. This sort of light source apparatus having a simple configuration is advantageous from the perspective of cost.

Incidentally, in the illumination unit (light irradiating apparatus) of the above image reading apparatus, in the light source apparatus using light-emitting diodes as a light source, ordinarily, the light-emitting diodes are arranged in a single line at a certain interval. Therefore, there is a tendency for brightness unevenness to occur in the light with which the original is irradiated.

However, in the illumination unit of the above image reading apparatus, in order to increase the accuracy of reading an image of an original, it is effective to reduce the brightness unevenness of the light with which the original is irradiated as much as possible. As described above, in the light source apparatus as described in Patent Document 1 in which light-emitting diodes are disposed at intervals in a line on the substrate, the irradiating light includes direct light that is directly emitted from the light-emitting diodes, and substrate-reflected light, which is light that is emitted from the light-emitting diode and reflected by the substrate.

Therefore, for example, in the above light source apparatus described in Patent Document 1, a scheme is implemented in which substrate-reflected light, which is light emitted from the light-emitting diodes and reflected by the substrate, is suppressed. More specifically, on a forward side from the light-emitting face of the light-emitting diodes in the surface of the substrate where the light-emitting diodes are installed, a black area is formed that extends forward from the lower edge of this light-emitting face with a wider width than the width of the light-emitting face.

In the light source apparatus described in Patent Document 1, the black area is formed wider than the width of the light-emitting face of the light-emitting diodes. Therefore, as a result, substrate-reflected light that is reflected by the substrate is suppressed, but by suppressing the substrate-reflected light, merely the amount of light that is reflected is reduced, and so it is conceivable that the effect of suppressing light brightness unevenness is small.

SUMMARY OF THE INVENTION

The present invention was made in view of such circumstances, and it is an object thereof to provide a light source apparatus employing a light-emitting diode as a light source and having the effect that unevenness in light brightness is suppressed with a simple configuration, a light irradiating apparatus provided with the light source apparatus, an image reading apparatus provided with the light irradiating apparatus, and an image forming apparatus provided with the image reading apparatus.

In the light source apparatus according to the present invention, a light source apparatus is presumed in which a plurality of light-emitting elements provided with a light-emitting face are disposed at intervals in a line on a surface of a substrate, and emit irradiating light from the light-emitting face forward along the surface of the substrate.

In this light source apparatus, on a forward side from the light-emitting face in the surface of the substrate, a light reflection suppression area is formed that extends forward from a lower edge of the light-emitting face with a smaller width than the width of the light-emitting face.

In the above light source apparatus, the irradiating light includes direct light that is directly emitted from the light-emitting elements, and substrate-reflected light that is light emitted from the light-emitting elements and reflected by the substrate.

The light reflection suppression area is formed with a smaller width than the width of the light-emitting face of the light-emitting elements. Therefore, for light emitted from a center portion of the light-emitting face of the light-emitting elements, reflection is suppressed in the light reflection suppression area, and so the irradiating light is mainly the direct light emitted from the light-emitting elements. On the other hand, because the width of the light reflection suppression area is less than the width of the light-emitting face of the light-emitting elements, light emitted from both end peripheral portions of the light-emitting face of the light-emitting elements is reflected at a portion other than the light reflection suppression area, so reflection is not suppressed, and thus the irradiating light includes direct light emitted from the light-emitting elements and substrate-reflected light.

Therefore, light brightness unevenness is suppressed for the irradiating light as a whole in the above light source apparatus. Also, the above light source apparatus has a simple structure in which the light-emitting elements are disposed at intervals in a line on the substrate.

In the above light source apparatus, ordinarily, it is preferable that the light-emitting elements are side-type light-emitting elements provided with a light-emitting face on a side face. In a side-type light-emitting element, the light-emitting face where light is emitted is provided on a side face, so with the side-type light-emitting element attached to the surface of the substrate, the light-emitting face is ordinarily approximately perpendicular to the surface of the substrate.

Also, in the above light source apparatus, it is preferable that the light reflection suppression area has the form of a face, and that the color of this face is black or gray. The reason for this is that with the colors black or gray, the reflectivity of light can be made less than with other colors, and so an optimal light reflection suppression area can be provided.

In the above light source apparatus, it is preferable that a light reflection promoting area where light reflectivity is higher than in the light reflection suppression area is formed on the forward side of the light-emitting face of the light-emitting elements on the surface of the substrate, in a portion other than the light reflection suppression area.

By adopting such a configuration, reflection is promoted for light irradiated from both end peripheral portions of the light-emitting face of the light-emitting elements. Accordingly, it is possible to strengthen irradiating light that includes direct light and substrate-reflected light resulting from emitted light from both end peripheral portions of the light-emitting face.

Therefore, the brightness of irradiating light resulting from emitted light from both end peripheral portions of the light-emitting face can be brought near the brightness of irradiating light that is mainly direct light from the center portion of the light-emitting face of the light-emitting elements, so it is possible to suppress brightness unevenness of light of the light source apparatus.

In a light source apparatus provided with the above light reflection promoting area, the light reflection promoting area is preferably a white face. The reason for this is that with the color white, the reflectivity of light can be made greater than with other colors, which is optimal for a light reflection promoting area. This light reflection promoting area is ordinarily formed by silk printing.

Furthermore, in a light source apparatus provided with the above light reflection promoting area, it is preferable that a white light reflection promoting area is formed on the surface of a white resist layer formed on the surface of a substrate.

In this configuration, with respect to the substrate on which the above light-emitting elements are installed, ordinarily a copper foil pattern is formed as a circuit on the surface of a sheet-like substrate, and a resist layer is formed on (the surface of) that copper foil pattern. In this case, white is used for the color of the resist layer. The above-described white light reflection promoting area is formed on (the surface of) the white resist layer.

Therefore, by using white as the color of the resist layer, it is possible to further increase the light reflectivity of the white light reflection promoting area formed thereon.

A light irradiating apparatus of the present invention can be configured using any of the above light source apparatuses. This light irradiating apparatus is an apparatus in which a light irradiation subject is irradiated with light by the light source apparatus to obtain subject-reflected light.

In this light irradiating apparatus, the light source apparatus is disposed such that the optical axis of irradiating light, that is, light emitted from the light-emitting face of a side-type light-emitting element in the light source apparatus to irradiate a light irradiation subject, is oblique to the optical axis of the subject-reflected light.

The light irradiating apparatus configured in this manner has the operation and effects provided by the above light source apparatus.

The above light irradiating apparatus can be configured using one of the above light source apparatus. Alternatively, the above light irradiating apparatus can be configured using two of the above light source apparatus.

When a light irradiating apparatus is configured using two of the above light source apparatuses, the two light source apparatuses are disposed such that the optical axis of irradiating light of one light source apparatus is approximately symmetrical to the optical axis of irradiating light of the other light source apparatus, using the optical axis of subject-reflected light as the symmetry axis.

With the light irradiating apparatus provided with two light source apparatuses configured in this manner, it is possible to strengthen irradiating light compared to a light irradiating apparatus provided with one light source apparatus.

An image reading apparatus of the present invention can be configured using the above light irradiating apparatus. This image reading apparatus employing the above light irradiating apparatus has the operation and effects provided by the above light irradiating apparatus.

An image forming apparatus of the present invention can be configured using the above image reading apparatus as one constituent element. This image forming apparatus employing the above image reading apparatus has the operation and effects provided, by the above image reading apparatus.

BRIEF DESCRIPTION OF THE DRAWINGS

FIG. 19 is a table showing results of testing of the effects of an image reading apparatus in the embodiment.

DESCRIPTION OF PREFERRED EMBODIMENTS

Hereinafter, a light source substrate (light source apparatus), an illumination unit (light irradiating apparatus) provided with the light source substrate, an image reading apparatus provided with the illumination unit, and an image forming apparatus provided with the image reading apparatus according to an embodiment of the present invention are described in detail with reference to the accompanying drawings.

Figure 1:
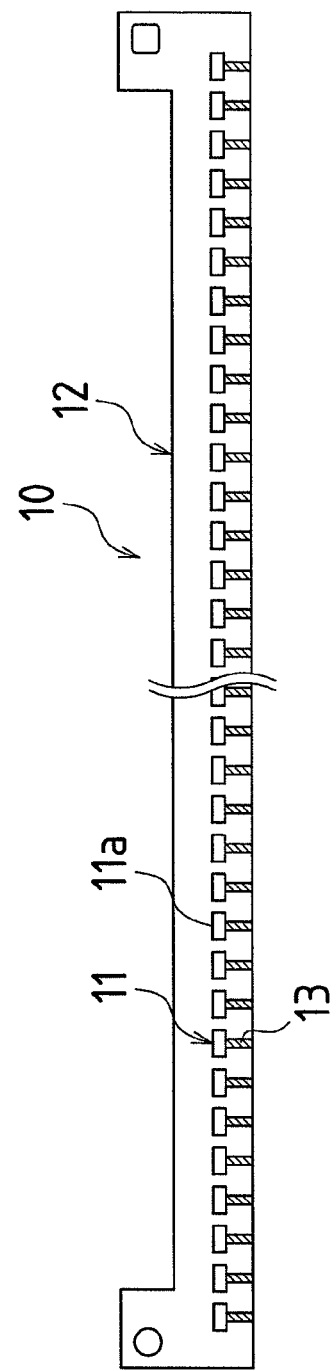
FIG. 1 is a plan view of a light source substrate in an embodiment.
Figure 2:
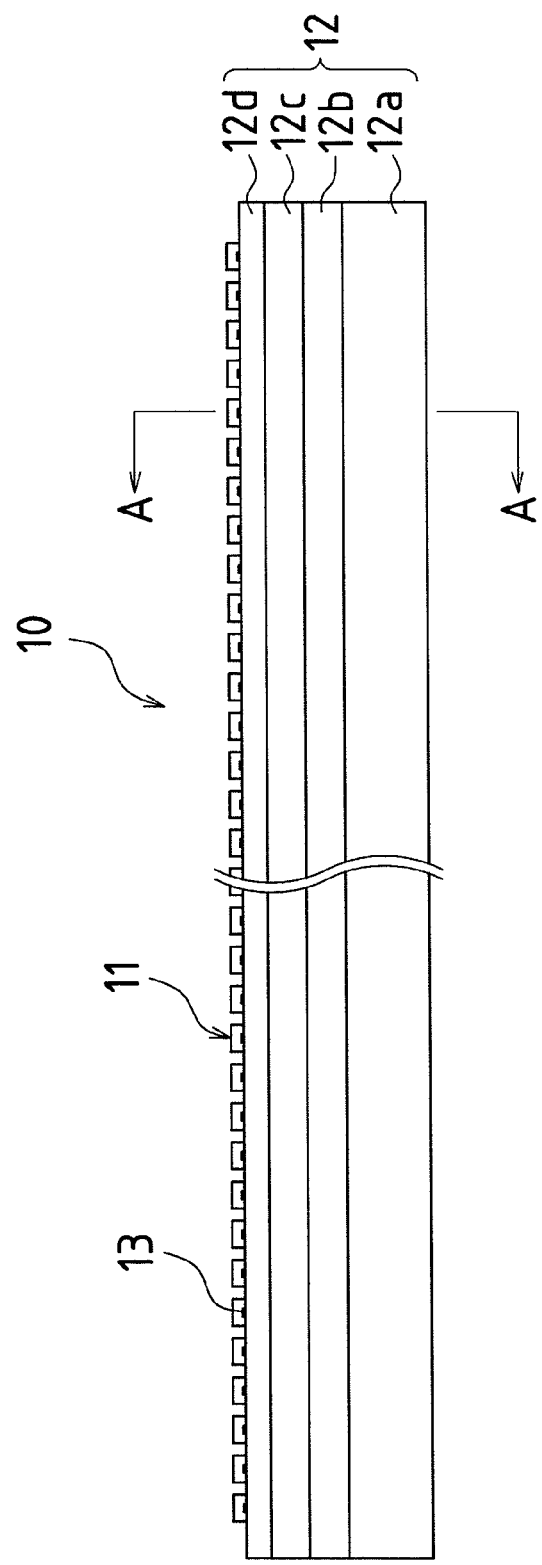
FIG. 2 is a front view of a light source substrate in the embodiment.
Figure 3:
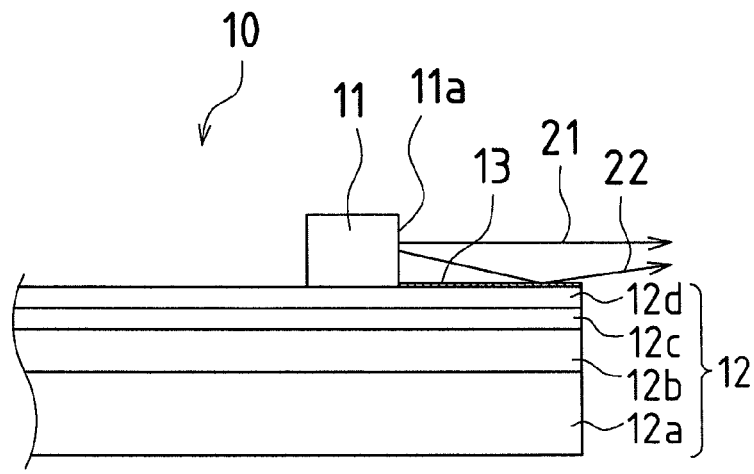
FIG. 3 is a cross-sectional view taken along line A-A in FIG. 2.
Figure 4:
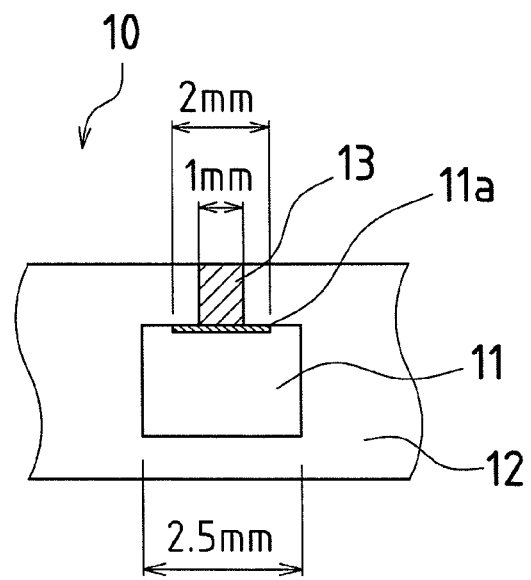
FIG. 4 is an enlarged view of part of FIG. 1.

First is a description of the light source substrate in the present embodiment. The light source substrate in the present embodiment corresponds to the above-described light source apparatus. FIG. 1 is a plan view of a light source substrate 10 in the present embodiment, FIG. 2 is a front view thereof, FIG. 3 is a cross-sectional view taken along line A-A in FIG. 2, and FIG. 4 is an enlarged view of part of FIG. 1. In FIGS. 1 to 4, the light source substrate 10 is configured with light-emitting diodes 11 and a substrate 12.

Herein, as shown in FIGS. 2 and 3, the substrate 12 is configured with a sheet-like base material 12a formed from phenolic paper or the like, a copper foil, pattern 12b formed as a circuit on a surface of the base material 12a, and a resist layer 12c formed on (the surface of) the copper foil pattern 12b. The color of this resist layer 12c is white. Furthermore, a white layer 12d is formed by silk printing on the white resist layer 12c.

As shown in FIGS. 1 to 3, the side-type light-emitting diodes 11, which are side-type light-emitting elements provided with a light-emitting face 11a on a side face, are installed at intervals in a side-by-side line on a surface of the substrate 12, with the light-emitting face 11a facing forward, such that irradiating light is emitted from the light-emitting face 11a forward along the surface of the substrate 12.

Each light-emitting diode 11, which is a side-type light-emitting element, has the shape of a rectangular parallelepiped, and the light-emitting face 11a where light of the light-emitting diode 11 is emitted is formed on a side face of the light-emitting diode 11, so with the side-type light-emitting element 11 attached to the surface of the substrate 12, the light-emitting face 11a is approximately perpendicular to the surface of the substrate 12.

As shown in FIG. 4, the width of the light-emitting face 11a of the light-emitting diode 11 is 2 mm, and the width of a wall face of the light-emitting diode 11 where the light-emitting face 11a is provided is 2.5 mm.

Moreover, as shown in FIG. 4, in the light source substrate 10, a black layer 13 is formed on (the surface of) the white layer 12d, which is the surface of the substrate 12. The black layer 13 is formed by printing at a width of 1 mm, which is less than the width of the light-emitting face 11a, on (the surface of) the white layer 12d that is the surface of the substrate 12 and on the forward side of the light-emitting face 11a of the light-emitting diode 11, extending forward from the lower edge of the light-emitting face 11a to the front edge portion of the substrate 12.

The black layer 13 corresponds to the above-described light reflection suppression area. In the above-described light source substrate 10, the color of the black layer 13 corresponding to the light reflection suppression area is black, but the color of this layer may also be gray. With the color black or gray, the reflectivity of light can be made less than with other colors, so these are excellent colors for the light reflection suppression area.

In the above light source substrate 10, the light-emitting diodes 11 are installed at intervals in a side-by-side line in the substrate 12, and as shown in FIG. 3, the irradiating light emitted from the light source substrate 10 includes a direct light 21 emitted directly from the light-emitting diode 11, and a substrate-reflected light 22, which is emitted from the light-emitting diode 11 and reflected by the surface of the substrate 12.

The black layer 13 corresponding to the above-described light reflection suppression area is formed at a width of 1 mm, which is less than the width of the light-emitting face 11a of the light-emitting diode 11. Therefore, for light emitted from the center portion of the light-emitting face 11a of the light-emitting diode 11, reflection is suppressed by the black layer 13, and so the irradiating light is mainly the direct light 21 emitted from the light-emitting diode 11.

On the other hand, because the width of the black layer 13 serving as the light reflection suppression area is less than the width of the light-emitting face 11a of the light-emitting diode 11, light emitted from both end peripheral portions of the light-emitting face 11a of the light-emitting diode 11 is reflected at a portion other than the black layer 13, so reflection is not suppressed. Accordingly, the irradiating light includes the direct light 21 emitted from the light-emitting diode 11 and substrate-reflected light 22, so light brightness unevenness is suppressed for the irradiating light as a whole in the light source substrate 10.

In the above light source substrate 10, as described above, the black layer 13 is formed on (the surface of) the white layer 12d, which is the surface of the substrate 12. That is, in the portion other than the black layer 13, the white layer 12d is exposed, and this portion is white.

In the white portion where the white layer 12d is exposed, on the front side of the light-emitting face 11a of the light-emitting diode 11 on the surface of the substrate 12, the portion other than the black layer 13 corresponding to the above-described light reflection suppression area corresponds to the above-described light reflection promoting area. This light reflection promoting area has the following function.

That is, due to the above light reflection promoting area being formed, light emitted from both end peripheral portions of the light-emitting face 11a of the light-emitting diode 11 is reflected by the white portion where the white layer 12d, which is the portion other than the black layer 13, is exposed, and thus reflection of that light is promoted. Accordingly, it is possible to strengthen irradiating light including the direct light 21 and the substrate-reflected light 22 resulting from emitted light from both end peripheral portions of the light-emitting face 11a of the light-emitting diode 11.

Therefore, the brightness of irradiating light resulting from emitted light from both end peripheral portions of the light-emitting face 11a of the light-emitting diode 11 can be brought near the brightness of irradiating light that is mainly the direct light 21 from the center portion of the light-emitting face 11a of the light-emitting diode 11, so it is possible to suppress brightness unevenness of light emitted from the light source substrate 10.

With respect to the above point, in the above light source substrate 10, the reason for using white as the color of the above white layer 12d is that with the color white, the reflectivity of light can be made greater than with other colors. Also, as described above, the above white layer 12d is formed on the white resist layer 12c. This is because by using white for the resist layer 12c, as described below, it is possible to make the reflectivity of light greater than when a color other than white is used for the resist layer 12c.

Next is a description of the illumination unit in the present embodiment. The illumination unit in the present embodiment corresponds to the above-described light irradiating apparatus. The illumination unit is provided with the above light source substrate 10, and is an apparatus in which a light irradiation subject is irradiated with light by the light source substrate 10 to obtain subject-reflected light.

Figure 5:
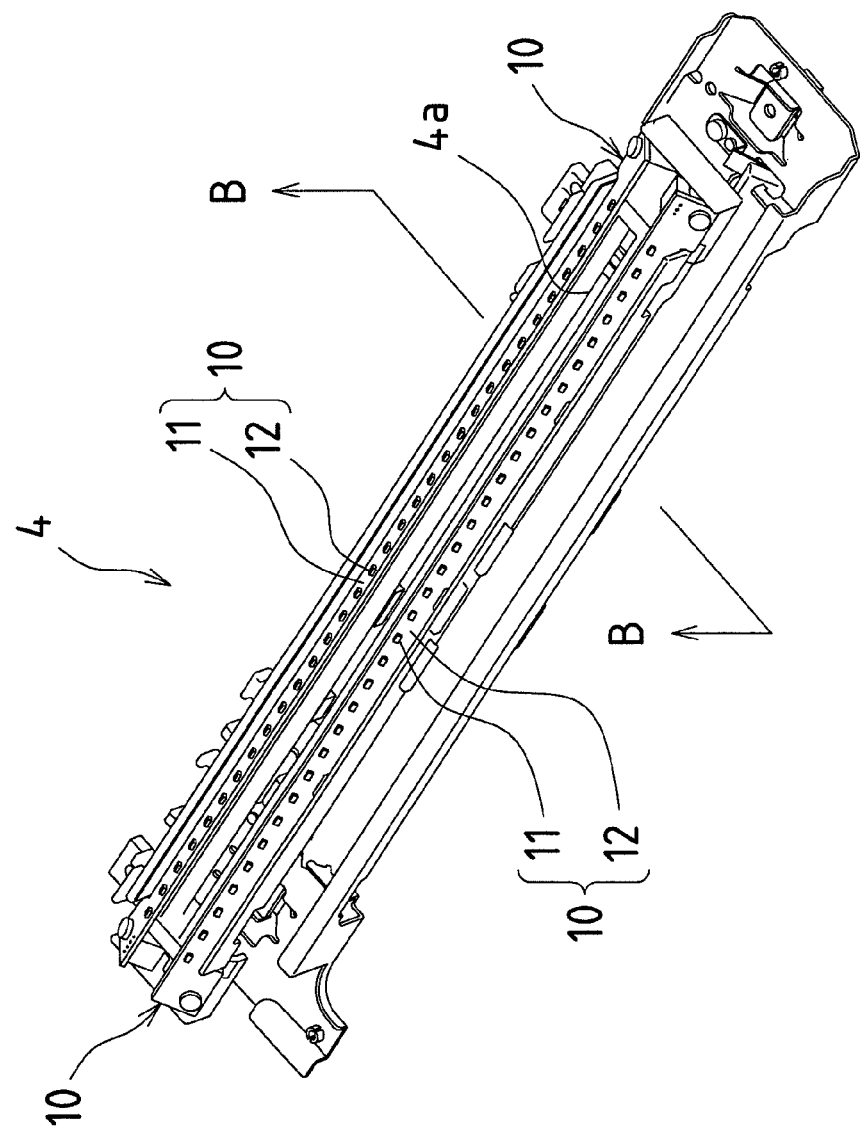
FIG. 5 is a perspective view showing the appearance of an illumination unit in the embodiment.
Figure 6:
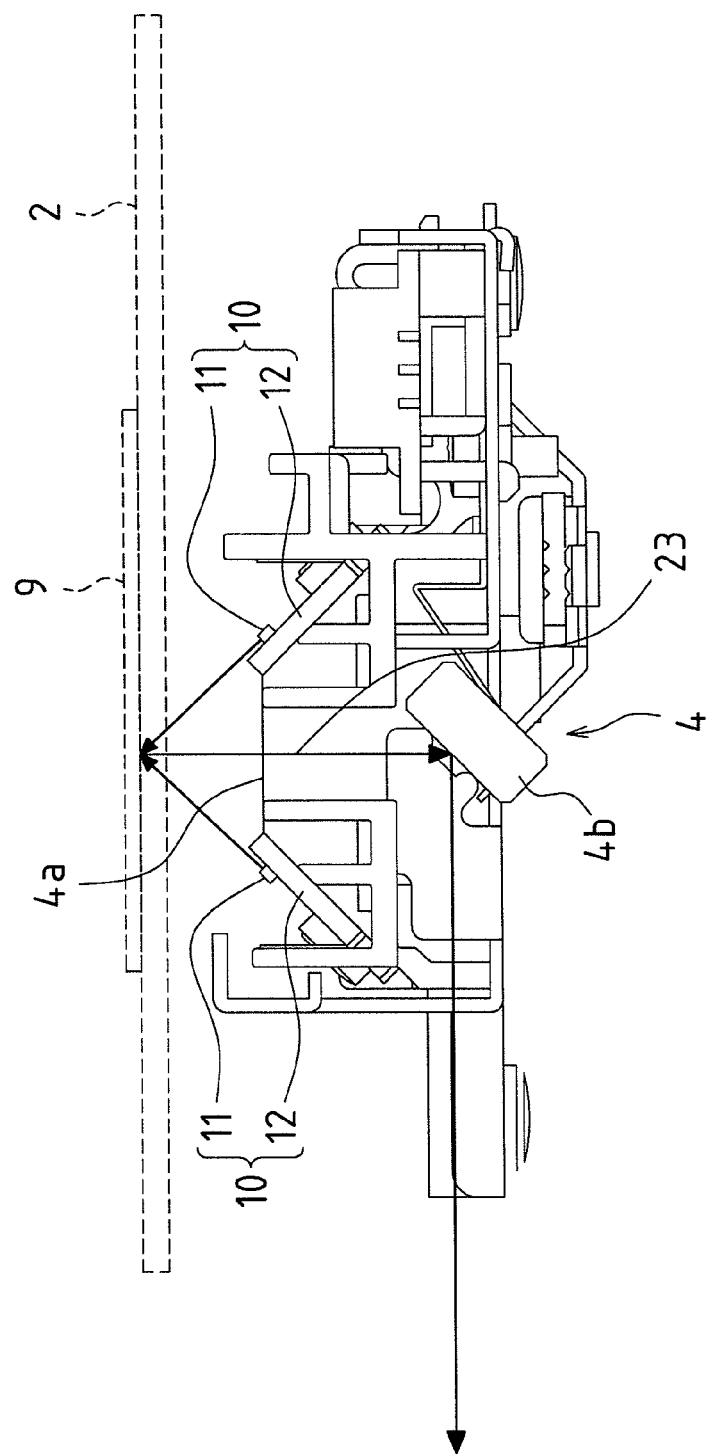
FIG. 6 is a cross-sectional view taken along line B-B in FIG. 5.
Figure 7:
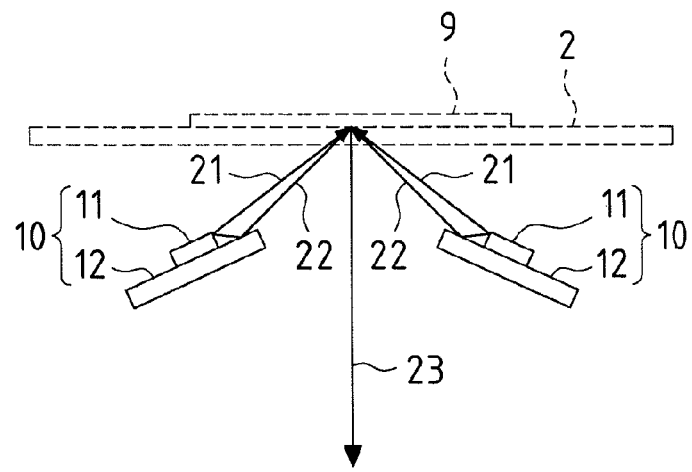
FIG. 7 is an enlarged view of part of FIG. 6.

FIG. 5 is a perspective view showing the appearance of an illumination unit 4, FIG. 6 is a cross-sectional view taken along line B-B in FIG. 5, and FIG. 7 is an enlarged view of part of FIG. 6. In FIGS. 6 and 7, an original placement plate 2 is part of an image reading apparatus 1 described below in which the illumination unit 4 is installed, and an original 9 is the light irradiation subject, whose image is read by the image reading apparatus 1.

In FIGS. 5 to 7, the illumination unit 4 is configured using two of the above light source substrates 10. The illumination unit 4 is configured with the light source substrates 10 disposed such that the optical axis of the irradiating lights 21 and 22, which are emitted from the light-emitting face 11a of the side-type light-emitting diodes 11 used in the light source substrates 10 and irradiate the original 9 serving as the light irradiation subject, is oblique to the optical axis 23 of the subject-reflected light.

The two light source substrates 10 are disposed such that the optical axis of the irradiating lights 21 and 22 of one light source substrate 10 is approximately symmetrical to the optical axis of the irradiating lights 21 and 22 of the other light source substrate 10, using an optical axis 23 of subject-reflected light as the symmetry axis.

The above subject-reflected light passes through a slit 4a provided between the two light source substrates 10, is incident on and reflected by a reflecting mirror 4b, and is output outside of the illumination unit 4.

Figure 8:
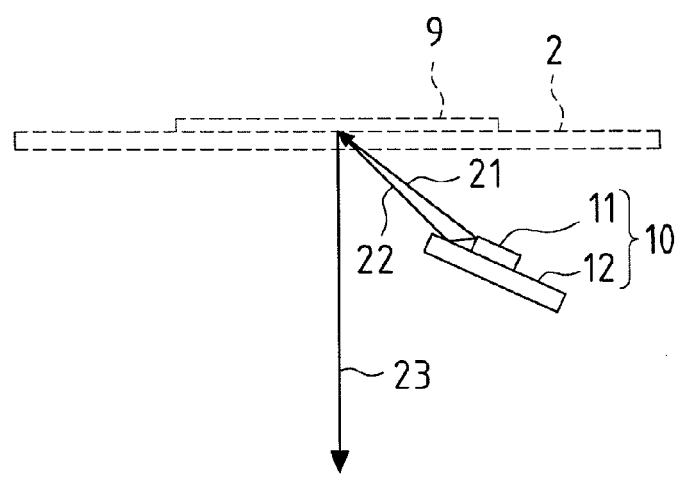
FIG. 8 is an enlarged view of part of an illumination unit of another example in the embodiment.

As described above, two light source substrates 10 are used in the above illumination unit 4, but as shown in FIG. 8, the illumination unit 4 can also be configured with one light source substrate 10. In the above illumination unit 4 using two light source substrates 10, it is possible to strengthen irradiating light compared to an illumination unit configured with one light source substrate 10.

Figure 9:
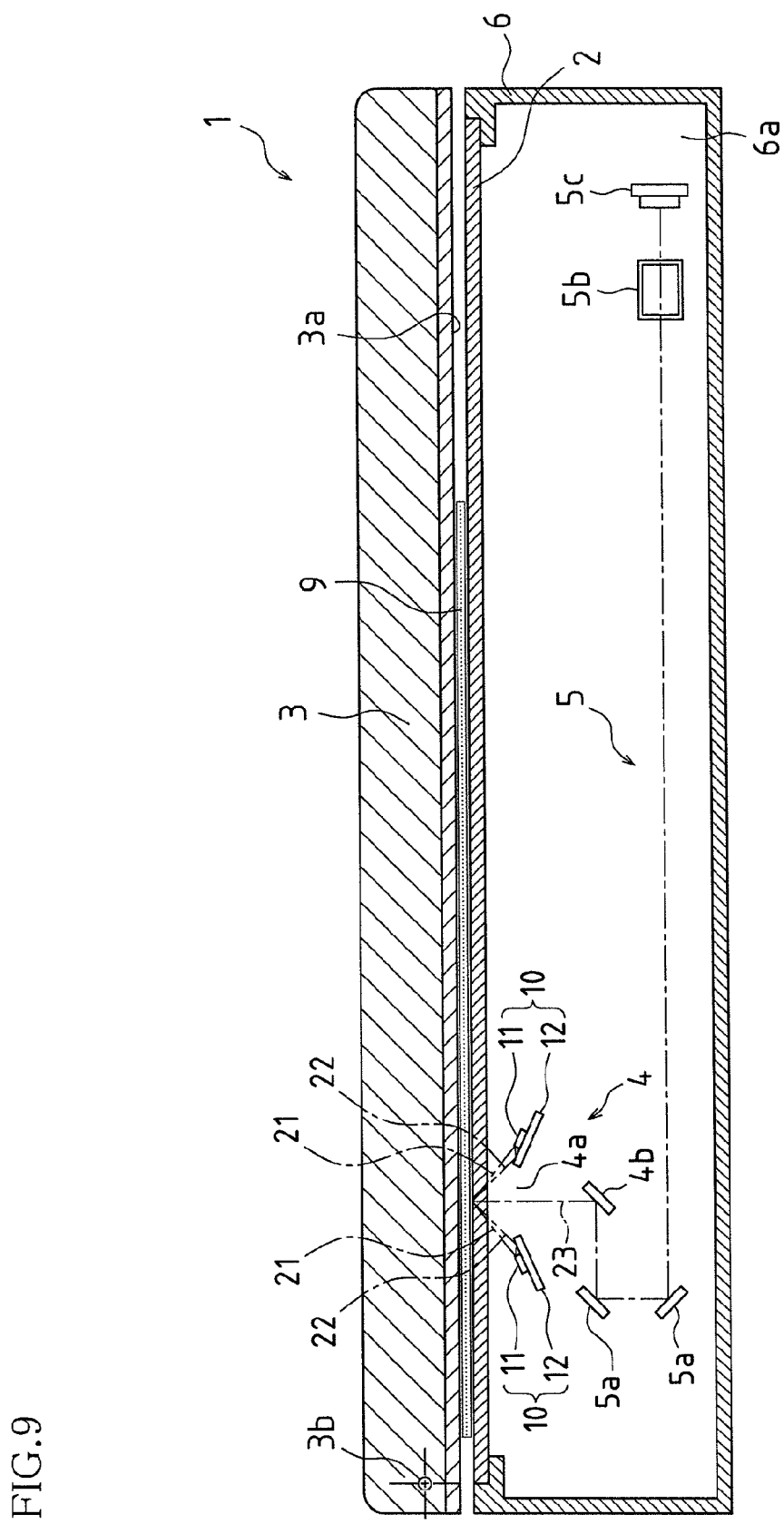
FIG. 9 is a cross-sectional view of an image reading apparatus in the embodiment.

Next is a description of the image reading apparatus in the present embodiment. The image reading apparatus in the present embodiment is provided with the above illumination unit 4. FIG. 9 is a cross-sectional view of the image reading apparatus 1 in the present embodiment.

In FIG. 9, relative to the drawing, the near side is the upper side of the image reading apparatus 1, the far side is the lower side of the image reading apparatus 1, the left side of the drawing corresponds to the front of the image reading apparatus 1, and the right side of the drawing corresponds to the rear of the reading apparatus 1.

In FIG. 9, the image reading apparatus 1 in the present embodiment is configured with the original placement plate 2, an original pressing plate 3, the above illumination unit 4, and a photoelectric converter 5. Note that in FIG. 9, with respect to the illumination unit 4, for ease of understanding, only the light source substrates 10, the slit 4a, and the reflecting mirror 4b, which are constituent elements of the illumination unit 4, are shown.

In the above image reading apparatus 1, the original placement plate 2 has the form of a sheet-like rectangle whose longitudinal direction is the front-rear direction, and is formed of a light-transmitting material such as glass. The original placement plate 2 has the function that the original 9 is placed on the surface of the original placement plate 2. Also, the original placement plate 2 is formed with a greater width than the maximum width of an original placed on the surface of the original placement plate 2.

The original placement plate 2 is installed on a pedestal 6. Inside of the pedestal 6, an internal space 6a is formed wherein the lower face of the original placement plate 2 serves as a ceiling, and the illumination unit 4 and the photoelectric converter 5 are provided in the internal space 6a.

As shown in FIG. 9, the photoelectric converter 5 is configured with two reflecting mirrors 5a, a lens group 5b, and a CCD imaging element 5c. Herein, the two reflecting mirrors 5a are held by holders provided in an unshown illumination unit holding/driving unit of the illumination unit 4, and move as a single body together with the illumination unit 4.

The first reflecting mirror 5a is disposed to the front of the illumination unit 4, and downwardly reflects light output from the illumination unit 4. The second reflecting mirror 5a is disposed below the first reflecting mirror 5a, and rearwardly reflects the light reflected by the first reflecting mirror 5a. The light reflected by the second reflecting mirror 5a passes through the lens group 5b, and is converged and converted to an image signal at the CCD imaging element 5c. By this conversion to an image signal, the original 9 is read.

The original pressing plate 3 is provided above the original placement plate 2. A rotating support shaft 3b is provided in a front end portion of the original pressing plate 3. The rotating support shaft 3b is held by an unshown rotating support shaft holder attached to the pedestal 6, and is attached to the pedestal 6 such that the original pressing plate 3 is capable of turning relative to the original placement plate 2 attached to the pedestal 6, with the rotating support shaft 3b as the center of rotation.

Therefore, the original pressing plate 3 can be opened/closed relative to the original placement plate 2 by the rotating support shaft 3b. With this opening/closing function, when using the image reading apparatus 1, first the original pressing plate 3 is opened relative to the original placement plate 2, and after the original 9 is placed on the surface of the original placement plate 2, the original pressing plate 3 is closed.

In a state in which the original 9 is prevented from moving by pressing against the original 9 with the original pressing plate 3, by pressing an unshown reading instruction button or the like, reading of the original 9 is performed as described above, and when this reading ends, the original pressing plate 3 is again opened and the original 9 is removed.

A reflecting face 3a is formed on the lower face of the original pressing plate 3. The reflecting face 3a is formed of a material having high light reflectivity. A flat metal sheet made of stainless steel (SUS), a flat highly reflective film, or the like can be used as this material.

When the reflecting face 3a of the original pressing plate 3 is formed of stainless steel (SUS), because stainless steel is unlikely to rust, luster can be preserved, so high reflectivity can be maintained. High reflectivity can also be maintained when the reflecting face 3a is formed of a flat highly reflective film.

As described above, the illumination unit 4 is used in the above image reading apparatus 1, and the light source substrates 10 are used in the illumination 4. As described above, in the light source substrates 10, brightness unevenness of light emitted from the light source substrates 10 can be suppressed. Next is a description of testing performed using the above image reading apparatus 1 in order to view this effect, and the results of that testing.

Figure 10:
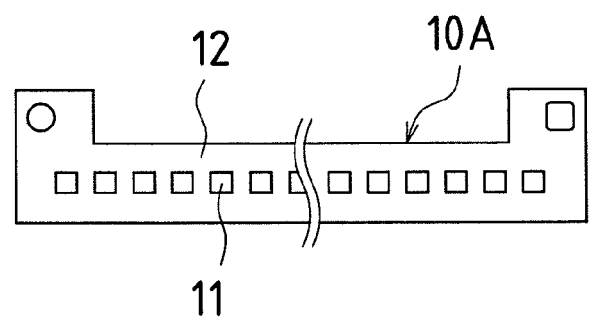
FIG. 10 is a plan view of a first light source substrate for comparing the effects of an image reading apparatus in the embodiment.
Figure 11:
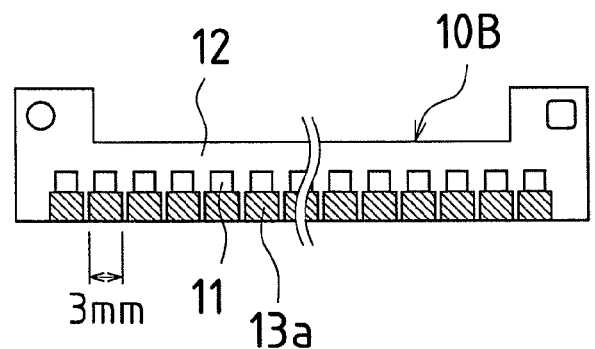
FIG. 11 is a plan view of a second light source substrate for comparing the effects of an image reading apparatus in the embodiment.

In order to compare effects when performing the above testing, a light source substrate 10A shown in FIG. 10 and a light source substrate 10B shown in FIG. 11, formed at the same size as the light source substrate 10, were created. The light source substrate 10A, the light source substrate 10B, and the light source substrate 10 were respectively installed in the illumination unit 4 of the image reading apparatus 1, a blank original having an original face in the paper surface color was read by the CCD imaging element 5c of the image reading apparatus 1, and results for the respective light source substrates were compared.

For the light source substrate 10A, a black layer 13a was not provided in the light source substrate 10, and the white layer 12d was exposed at the front face in the surface of the substrate 12. For the light source substrate 10B, a black layer 13a having a width of 3 mm rather than the 1 mm width of the black layer 13 was formed instead of the black layer 13.

Figure 12:
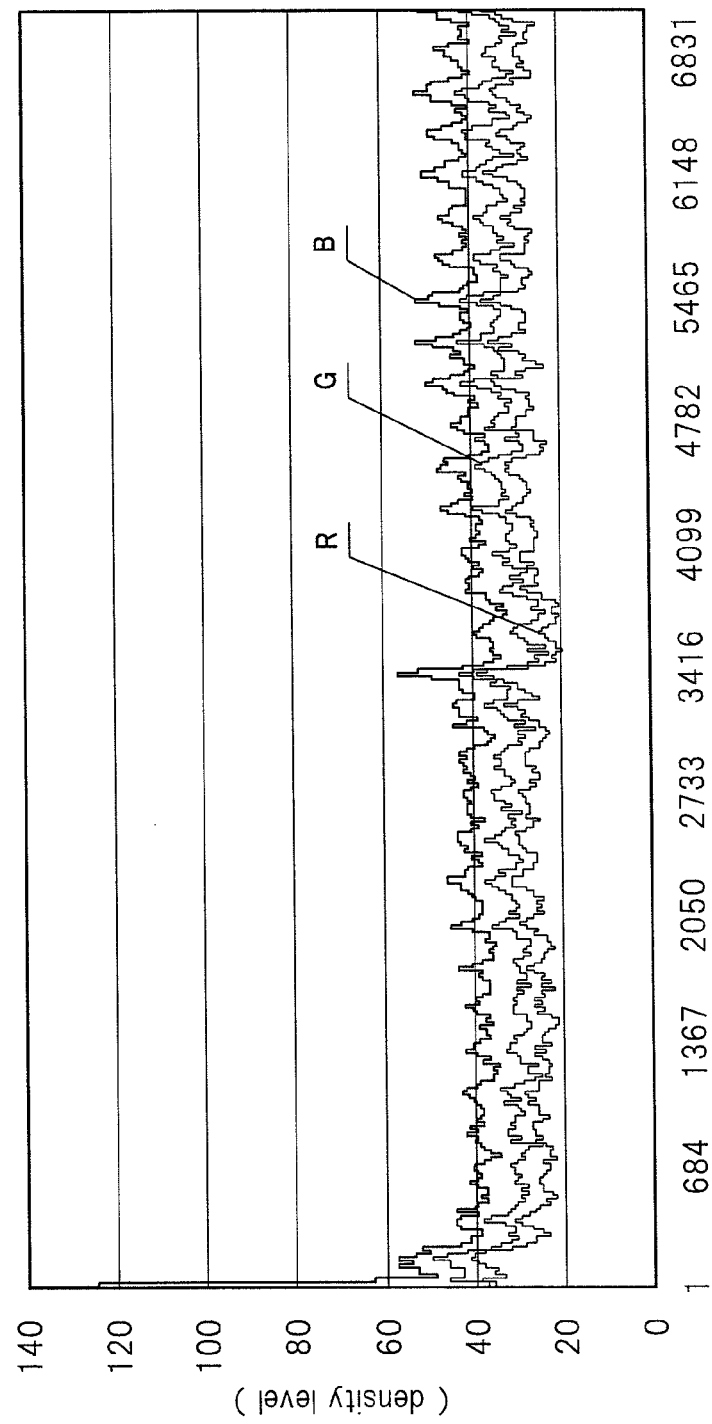
FIG. 12 is a first graph showing results of testing of the effects of an image reading apparatus in the embodiment.
Figure 13:
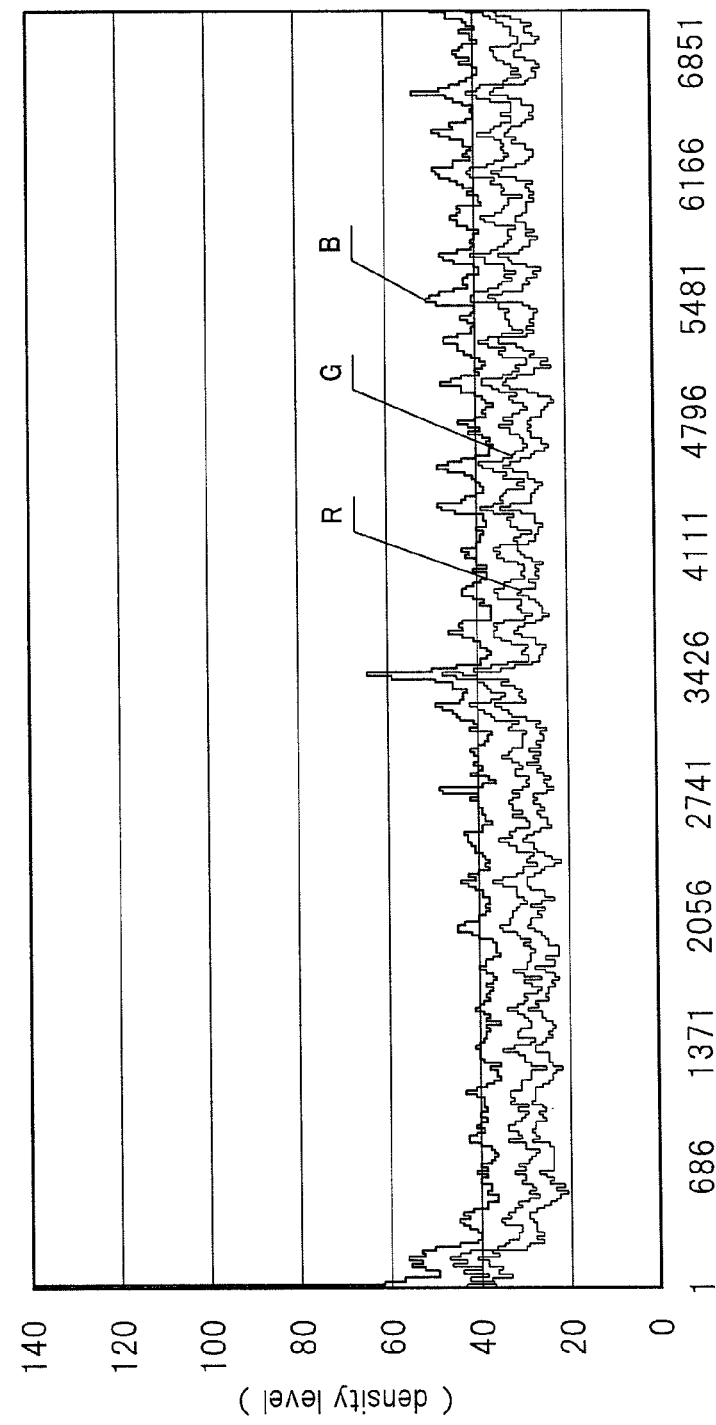
FIG. 13 is a second graph showing results of testing of the effects of an image reading apparatus in the embodiment.
Figure 14:
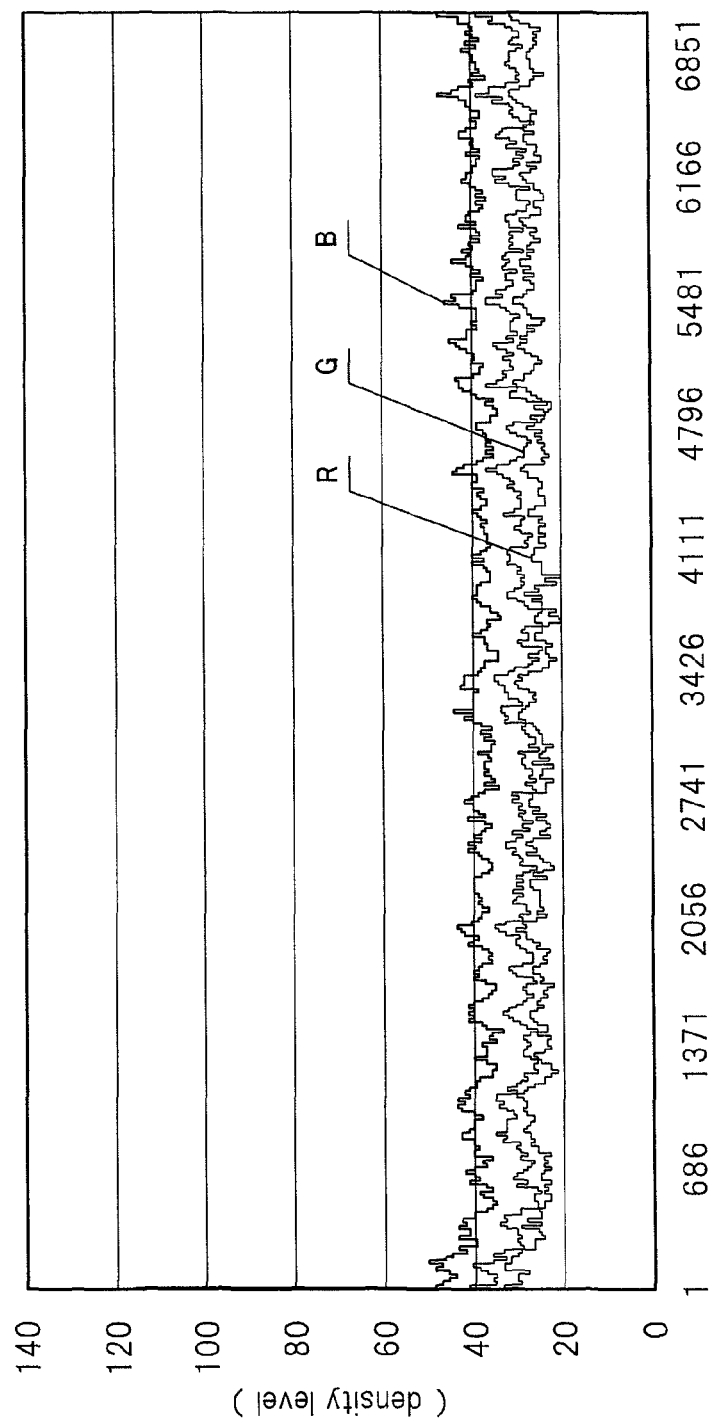
FIG. 14 is a third graph showing results of testing of the effects of an image reading apparatus in the embodiment.

FIGS. 12 to 14 are graphs showing the results of the above testing. In FIGS. 12 to 14, density level, that is, the output level of the CCD imaging element 5c of the image reading apparatus 1 is shown on the vertical axis, and the distance in the width direction of the original placement plate 2 of the image reading apparatus 1 in hierarchical order of reading resolution dots is shown in the horizontal axis. In the above graphs, illuminance is shown for each of the three elements of light: R (red), G (green), and blue (B). In FIGS. 12 to 14, results for the light source substrate 10A are shown in FIG. 12, results for the light source substrate 10B are shown in FIG. 13, and results for the light source substrate 10 are shown in FIG. 14.

In FIGS. 12 to 14, the waves of the waveform are smoother in the case of the light source substrate 10 shown in FIG. 14 than in the case of the light source substrate 10A shown in FIG. 12 or the case of the light source substrate 10B shown in FIG. 13. This indicates that brightness unevenness of light emitted from the light source substrate 10 is less than the brightness unevenness of light emitted from the light source substrate 10A or the light source substrate 10B.

Figure 15:
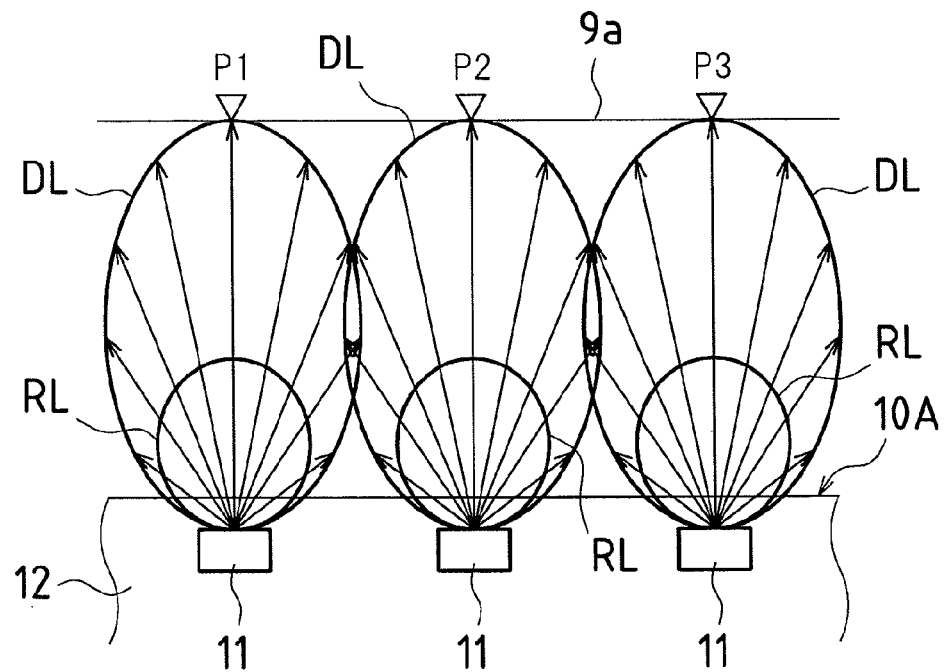
FIG. 15 is a first diagram of illuminance analysis according to theoretical analysis of an image reading apparatus in the embodiment.
Figure 16:
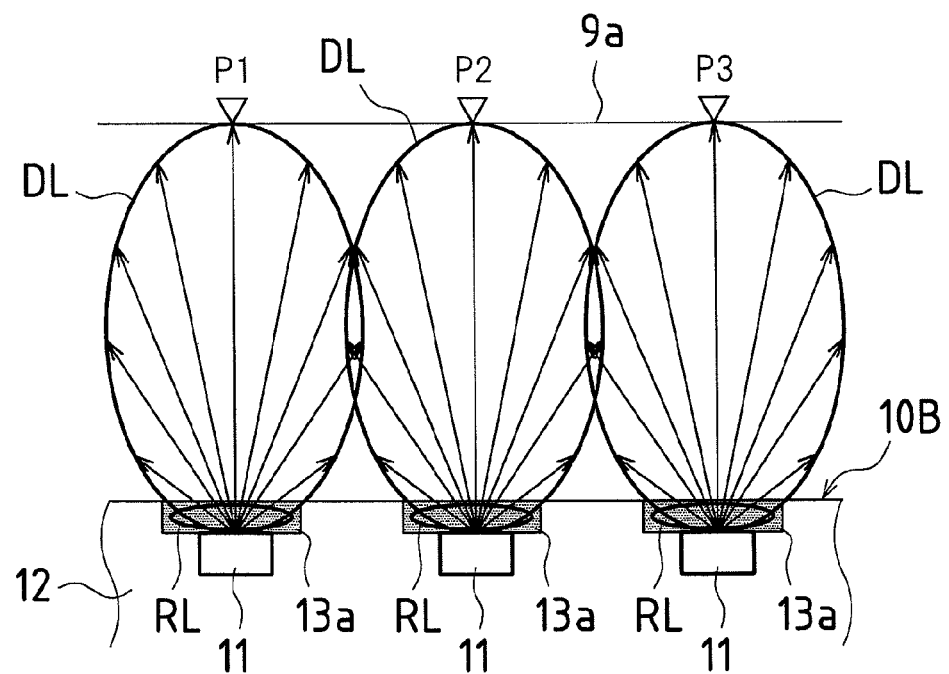
FIG. 16 is a second diagram of illuminance analysis according to theoretical analysis of an image reading apparatus in the embodiment.
Figure 17:
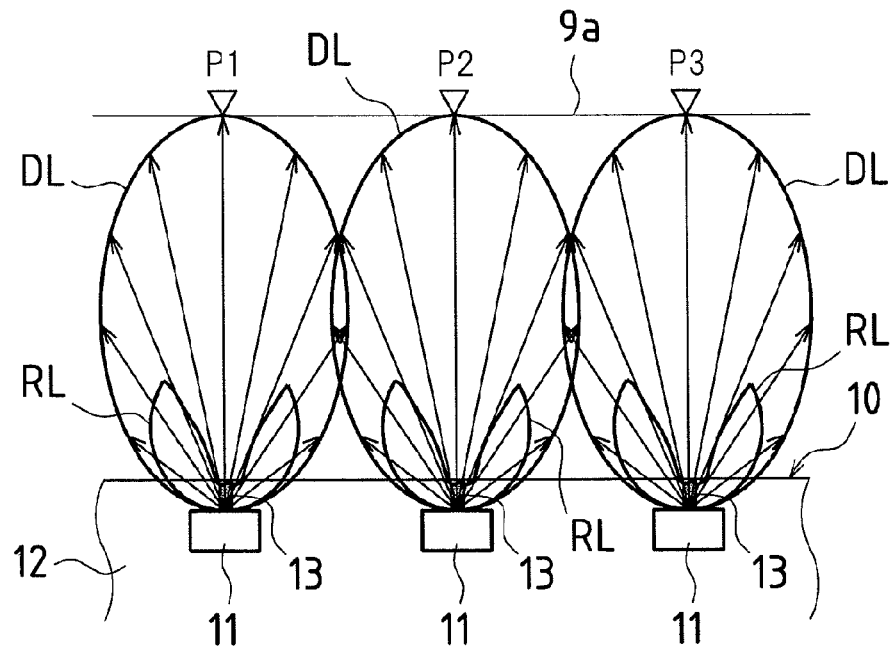
FIG. 17 is a third diagram of illuminance analysis according to theoretical analysis of an image reading apparatus in the embodiment.

Consequently, theoretical analysis for the above results was attempted, and this is described next. FIGS. 15 to 17 are illuminance analysis diagrams in which a light strength DL of direct light emitted from the light-emitting diodes 11 and a light strength RL of substrate-reflected light in the above light source substrate 10A, light source substrate 10B, and light source substrate 10 are indicated by distance from the light-emitting diodes 11 serving as a light source. In each of FIGS. 15 to 17, an original reading position 9a indicates the position of the placement plate of the image reading apparatus 1 where the face of the original to be read is placed.

Figure 18:
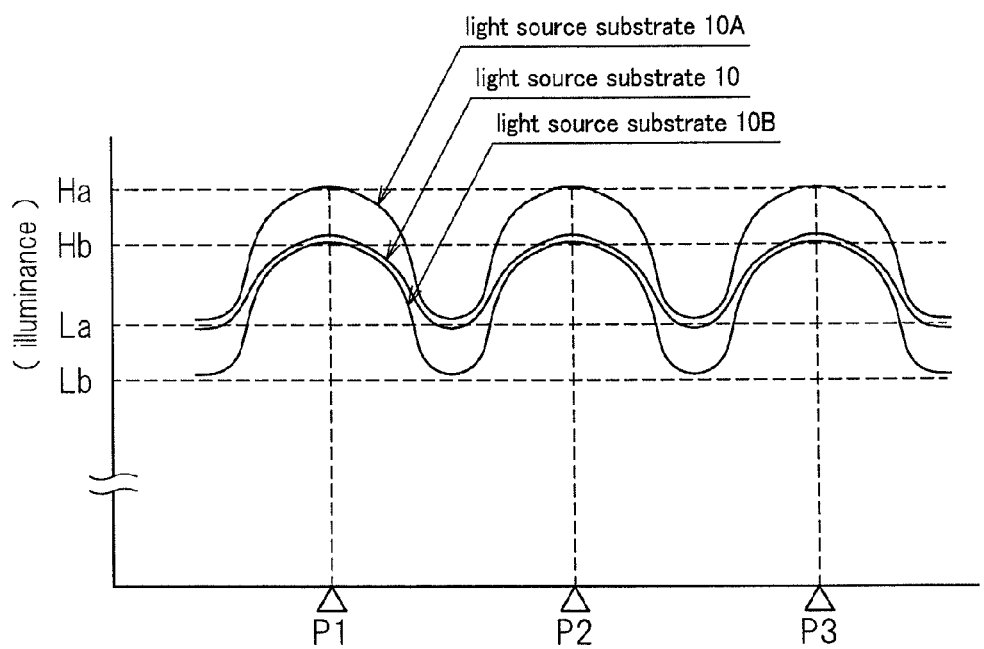
FIG. 18 is a graph showing illuminance according to theoretical analysis of an image reading apparatus in the embodiment.

FIG. 18 is a graph showing the illuminance of the original reading position 9a in FIGS. 15 to 17. Illuminance is shown on the vertical axis in FIG. 18, and distance in the direction that the light-emitting diodes 11 are disposed in a line is shown on the horizontal axis. P1, P2, and P3 in FIG. 18 indicate the same points in FIGS. 15 to 17.

In the case of the above light source substrate 10A in FIG. 15, the black layer 13a is not provided, so substrate-reflected light is not suppressed. Consequently, the illuminance at the original reading position 9a in this case is represented by a curve indicated for the light source substrate 10A in FIG. 18.

On the other hand, in the case of the light source substrate 10B in FIG. 16, the black layer 13a having a width of 3 mm is provided, so substrate-reflected light is suppressed. Consequently, the illuminance at the original reading position 9a in this case is represented by a curve indicated for the light source substrate 10B in FIG. 18, and illuminance is decreased to the extent that substrate-reflected light is suppressed. That is, in this case, compared to the case of the light source substrate 10A, merely illuminance is decreased, and so light brightness unevenness cannot be suppressed.

In contrast to the above case of the light source substrate 10A or the case of the light source substrate 10B, in the case of the light source substrate 10 in FIG. 17, as described above, the black layer 13 corresponding to the light reflection suppression area is formed at a width of 1 mm, which is narrower than the 2 mm width of the light-emitting face 11a of the light-emitting diode 11.

Therefore, for light emitted from the center portion of the light-emitting face 11a of the light-emitting diode 11, reflection is suppressed by the black layer 13, and so the irradiating light is mainly the direct light emitted from the light-emitting diode 11.

On the other hand, for light emitted from both end peripheral portions of the light-emitting face 11a of the light-emitting diode 11, because the black layer 13 serving as the light reflection suppression area is narrower than the width of the light-emitting face 11a of the light-emitting diode 11, the light is reflected at a portion other than the black layer 13, so reflection is not suppressed, and the irradiating light includes direct light and substrate-reflected light.

The illuminance at the original reading position 9a in this case is represented by a curve indicated for the light source substrate 10 in FIG. 18, and the curve is smoother than in the case of the light source substrate 10A or the case of the light source substrate 10B. That is, light brightness unevenness is suppressed for the irradiating light as a whole in the light source substrate 10.

After the above testing related to light brightness unevenness, the below testing was performed. That is, as described above, in the above image reading apparatus 1, the white layer 12d of the light source substrate 10 used in the illumination unit 4 provided in the image reading apparatus 1 is formed on the white resist layer 12c, as shown in FIGS. 2 and 3. This is because by using white as the color of the resist layer 12c, it is possible to have a higher light reflectivity than when using a color other than white.

The testing described below was performed in order to confirm this effect. When performing this testing, a light source substrate 10C was created that is identical to the above light source substrate 10, except that the color green, which is the color used in the conventional technology, was used as the color of the resist layer 12c in the light source substrate 10, rather than white.

That is, in the light source substrate 10, the white layer 12d is formed on the white resist layer 12c, but in the light source substrate 10C, the white layer 12d is formed on a green resist layer 12c.

In this testing, the light source substrate 10 and the light source substrate 10C were respectively installed in the illumination unit 4 of the image reading apparatus 1, and the illuminance of a portion directly above the illumination unit 4 in the original placement plate 2 of the image reading apparatus 1 was measured with an illuminometer.

FIG. 19 shows the results of this testing. As is clear from FIG. 19, illuminance is higher for the light source substrate 10 than for the light source substrate 10C. Accordingly, it is understood that by using white as the color of the resist layer 12c of the light source substrate 10, it is possible to have a higher light reflectivity than when using a color other than white as the color of the resist layer 12c.

According to the light source substrate 10 in the present embodiment described above, the black layer 13 serving as the light reflection suppression area is formed with a narrower width than the width of the light-emitting face 11a of the light-emitting diode 11. Therefore, for light emitted from the center portion of the light-emitting face 11a of the light-emitting diode 11, reflection is suppressed by the black layer 13 serving as the light reflection suppression area. Therefore, the irradiating light of the light source substrate 10 is mainly direct light emitted from the light-emitting diode 11.

On the other hand, for light emitted from both end peripheral portions of the light-emitting face 11a of the light-emitting diode 11, because the black layer 13 that is the light reflection suppression area is narrower than the width of the light-emitting face 11a of the light-emitting diode 11, this light is reflected by a portion other than the light reflection suppression area, so reflection is not suppressed. Accordingly, the irradiating light of the light source substrate 10 includes the direct light emitted from the light-emitting diode 11 and substrate-reflected light.

Therefore, brightness unevenness of light is suppressed for the irradiating light as a whole in the light source substrate 10. Also, the above light source substrate 10 has a simple structure with the light-emitting diodes 11 disposed at intervals in a line on the substrate. Accordingly, it is possible to adopt a simple structure for the light source substrate 10, and light brightness unevenness of the light source substrate 10 can be suppressed.

Also, the black layer 13 serving as the light reflection suppression area of the light source substrate 10 has the form of a face, and the color of that face is black. Therefore, it is possible to have a lower light reflectivity for the light reflection suppression area of the light source substrate 10 than with other colors.

Also, the light reflection promoting area where light reflectivity is higher than in the light reflection suppression area is formed on the forward side of the light-emitting face 11a of the light-emitting diode 11 on the surface of the light source substrate 10, in a portion other than the light reflection suppression area.

Therefore, reflection is promoted for light emitted from both end peripheral portions of the light-emitting face 11a of the light-emitting diode 11. Accordingly, it is possible to strengthen irradiating light including direct light and substrate-reflected light resulting from emitted light from both end peripheral portions of the light-emitting face 11a.

Therefore, the brightness of irradiating light resulting from emitted light from both end peripheral portions of the light-emitting face 11a can be brought near the brightness of irradiating light that is mainly direct light from the center portion of the light-emitting face 11a of the light-emitting diode 11, so it is possible to suppress brightness unevenness of light of the light source substrate 10.

Also, the light reflection promoting area of the light source substrate 10 has the form of a face, and the color of that face is white. Therefore, it is possible to have a higher light reflectivity for the light reflection promoting area of the light source substrate 10 than with other colors.

Furthermore, the white light reflection promoting area can be formed on the surface of the white resist layer 12c formed on the surface of the substrate 12. Therefore, by using white as the color of the resist layer 12c, it is possible to further increase the light reflectivity of the white light reflection promoting area formed thereon.

Also, the illumination unit 4 in the present embodiment provided with the above light source substrate 10 has the operation and effects provided by the above light source substrate 10. Also, the image reading apparatus 1 in the present embodiment provided with the above illumination unit 4 has the operation and effects provided by the above illumination unit 4.

Furthermore, the image reading apparatus 1 in the above present embodiment can be used as part of an image forming apparatus. More specifically, an image forming apparatus employing the image reading apparatus 1 in the above present embodiment can be configured. This image forming apparatus forms a recording image on a recording paper, based on an image of an original that has been read by the above image reading apparatus. An image forming apparatus provided with this image reading apparatus has the operation and effects of the above image reading apparatus 1 in the present embodiment.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

| REFERENCE SIGNS LIST | |
|---|---|
| 1 | image reading apparatus |
| 2 | original placement plate |
| 3 | original pressing plate |
| 3a | reflecting face |
| 3b | rotating support shaft |
| 4 | illumination unit |
| 4a | slit |
| 4b | reflecting mirror |
| 5 | photoelectric converter |
| 5a | reflecting mirror |
| 5b | lens group |
| 5c | imaging element |
| 6 | pedestal |
| 6a | internal space |
| 9 | original |
| 9a | original reading position |
| 10 | light source substrate |
| 10A | light source substrate |
| 10B | light source substrate |
| 10C | light source substrate |
| 11 | light-emitting diode |
| 11a | light-emitting face |
| 12 | substrate |
| 12a | base material |
| 12b | copper foil pattern |

REFERENCE SIGNS LIST

| | |
|---|---|
| 12c | resist layer |
| 12d | white layer |
| 13 | black layer |
| 13a | black layer |
| 21 | direct light |
| 22 | substrate-reflected light |
| 23 | optical axis of subject-reflected light |

What is claimed is:

1. A light source apparatus having a plurality of light-emitting elements provided with a light-emitting face that are disposed at intervals in a line on a surface of a substrate, and emit irradiating light from the light-emitting face in a forward direction along the surface of the substrate,
wherein on a forward side from the light-emitting face in the surface of the substrate, a light reflection suppression area is formed that extends in the forward direction from a lower edge of the light-emitting face the light reflection suppression area having a smaller width than a width of the light-emitting face.

2. The light source apparatus according to claim 1, wherein the light-emitting elements are side-type light-emitting elements having the light-emitting face provided on a side face.

3. The light source apparatus according to claim 1, wherein the light reflection suppression area is a black or gray-colored face.

4. The light source apparatus according to claim 2, wherein the light reflection suppression area is a black or gray-colored face.

5. The light source apparatus according to claim 1, wherein a light reflection promoting area where light reflectivity is higher than in the light reflection suppression area is formed on the forward side of the light-emitting face of the light-emitting elements on the surface of the substrate, in a portion other than the light reflection suppression area.

6. The light source apparatus according to claim 5, wherein the light reflection promoting area is a white face.

7. The light source apparatus according to claim 6, wherein the white light reflection promoting area is formed by silk printing.

8. The light source apparatus according to claim 6, wherein a white resist layer is formed on the surface of the substrate, and the white light reflection promoting area is formed on the surface of the resist layer.

9. A light irradiating apparatus having the light source apparatus according to claim 1, and a light irradiation subject being irradiated with light by the light source apparatus to obtain subject-reflected light,
wherein the light source apparatus is disposed such that the optical axis of irradiating light, the irradiating light being light emitted from the light-emitting face of the light source apparatus and applied to the light irradiation subject, is oblique to the optical axis of the subject-reflected light.

10. The light irradiating apparatus according to claim 9, comprising two of the light source apparatuses, the light source apparatuses being disposed such that the optical axis of irradiating light of one light source apparatus is approximately symmetrical to the optical axis of irradiating light of the other light source apparatus, using the optical axis of the subject-reflected light as a symmetry axis.

11. An image reading apparatus comprising the light irradiating apparatus according to claim 9.

12. An image forming apparatus comprising the image reading apparatus according to claim 11.

13. The light source apparatus according to claim 2, wherein a light reflection promoting area where light reflectivity is higher than in the light reflection suppression area is formed on the forward side of the light-emitting face of the light-emitting elements on the surface of the substrate, in a portion other than the light reflection suppression area.

14. The light source apparatus according to claim 3, wherein a light reflection promoting area where light reflectivity is higher than in the light reflection suppression area is formed on the forward side of the light-emitting face of the light-emitting elements on the surface of the substrate, in a portion other than the light reflection suppression area.

15. The light source apparatus according to claim 4, wherein a light reflection promoting area where light reflectivity is higher than in the light reflection suppression area is formed on the forward side of the light-emitting face of the light-emitting elements on the surface of the substrate, in a portion other than the light reflection suppression area.

16. The light source apparatus according to claim 7, wherein a white resist layer is formed on the surface of the substrate, and the white light reflection promoting area is formed on the surface of the resist layer.

17. A light irradiating apparatus having the light source apparatus according to claim 2, and a light irradiation subject being irradiated with light by the light source apparatus to obtain subject-reflected light,
wherein the light source apparatus is disposed such that the optical axis of irradiating light, the irradiating light being light emitted from the light-emitting face of the light source apparatus and applied to the light irradiation subject, is oblique to the optical axis of the subject-reflected light.

18. A light irradiating apparatus having the light source apparatus according to claim 3, and a light irradiation subject being irradiated with light by the light source apparatus to obtain subject-reflected light,
wherein the light source apparatus is disposed such that the optical axis of irradiating light, the irradiating light being light emitted from the light-emitting face of the light source apparatus and applied to the light irradiation subject, is oblique to the optical axis of the subject-reflected light.

19. A light irradiating apparatus having the light source apparatus according to claim 4, and a light irradiation subject being irradiated with light by the light source apparatus to obtain subject-reflected light,
wherein the light source apparatus is disposed such that the optical axis of irradiating light, the irradiating light being light emitted from the light-emitting face of the light source apparatus and applied to the light irradiation subject, is oblique to the optical axis of the subject-reflected light.

20. A light irradiating apparatus having the light source apparatus according to claim 5, and a light irradiation subject being irradiated with light by the light source apparatus to obtain subject-reflected light,
wherein the light source apparatus is disposed such that the optical axis of irradiating light, the irradiating light being light emitted from the light-emitting face of the light source apparatus and applied to the light irradiation subject, is oblique to the optical axis of the subject-reflected light.

* * * * *